US010771736B2

(12) United States Patent
Inkpen et al.

(10) Patent No.: US 10,771,736 B2
(45) Date of Patent: Sep. 8, 2020

(54) COMPOSITING AND TRANSMITTING CONTEXTUAL INFORMATION DURING AN AUDIO OR VIDEO CALL

(71) Applicant: MICROSOFT TECHNOLOGY LICENSING, LLC, Redmond, WA (US)

(72) Inventors: Kori M. Inkpen, Redmond, WA (US); Sasa Junuzovic, Kirkland, WA (US); Seungwon Kim, Christchurch (NZ); Aaron C. Hoff, Kirkland, WA (US); John C. Tang, Palo Alto, CA (US); David Alexander Molnar, Seattle, WA (US); Philip A. Chou, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/319,369

(22) Filed: Jun. 30, 2014

(65) Prior Publication Data

US 2015/0381930 A1   Dec. 31, 2015

(51) Int. Cl.
*H04N 7/14* (2006.01)
(52) U.S. Cl.
CPC .................. *H04N 7/147* (2013.01)
(58) Field of Classification Search
CPC ...................... H04N 7/141; H04N 7/147
USPC ....... 348/14.01, 14.12, 14.14, 14.15, 208.13, 348/333.03, 333.05
See application file for complete search history.

(56) References Cited

U.S. PATENT DOCUMENTS

| 8,060,068 B1* | 11/2011 | Mangal | H04M 3/42042 |
| | | | 455/415 |
| 2005/0052578 A1 | 3/2005 | Phillips et al. | |
| 2006/0203080 A1* | 9/2006 | Lessing | H04N 7/148 |
| | | | 348/14.01 |
| 2010/0066804 A1* | 3/2010 | Shoemake | H04N 7/147 |
| | | | 348/14.02 |

(Continued)

FOREIGN PATENT DOCUMENTS

| CN | 1633177 A | 6/2005 |
| CN | 101217643 A | 7/2008 |

(Continued)

OTHER PUBLICATIONS

"International Search Report and Written Opinion Issued in PCT Application No. PCT/US2015/038303", dated Sep. 16, 2015, 11 Pages.

(Continued)

*Primary Examiner* — Yosef K Laekemariam

(57) ABSTRACT

Aspects of the subject disclosure are directed towards providing contextual information (such as high resolution still images) during an audio or video call. A receiver of the contextual information may send commands to the sending device to specify a desired resolution and frame rate of such images. A receiving user also may determine how to display any video call frames and/or the contextual information on one or more display devices available to the receiving user. Other contextual information such as location-related data by which a user can determine and display a location of the other call participant (or participants) may be transmitted during the call.

20 Claims, 11 Drawing Sheets

(56) References Cited

U.S. PATENT DOCUMENTS

| | | | |
|---|---|---|---|
| 2010/0302446 A1* | 12/2010 | Mauchly | H04N 7/147 348/598 |
| 2011/0249073 A1 | 10/2011 | Cranfill et al. | |
| 2012/0092435 A1 | 4/2012 | Wohlert | |
| 2013/0088566 A1* | 4/2013 | Yang | H04N 7/147 348/14.12 |
| 2013/0106989 A1* | 5/2013 | Gage | H04N 7/152 348/14.09 |
| 2013/0335517 A1 | 12/2013 | Nishide et al. | |
| 2014/0078246 A1 | 3/2014 | Carpenter et al. | |
| 2014/0098182 A1 | 4/2014 | Kramarenko et al. | |

FOREIGN PATENT DOCUMENTS

| | | |
|---|---|---|
| CN | 102356641 A | 2/2012 |
| CN | 103002244 A | 3/2013 |
| CN | 103338340 A | 10/2013 |
| CN | 103517137 A | 1/2014 |

OTHER PUBLICATIONS

"Second Written Opinion Issued in PCT Application No. PCT/US2015/038303", dated May 30, 2016, 6 Pages.

"International Preliminary Report on Patentability Issued in PCT Application No. PCT/US2015/038303", dated Sep. 14, 2016, 7 Pages.

"First Office Action and Search Report Issued in Chinese Patent Application No. 201580035737.X", dated Dec. 20, 2018, 24 Pages.

"Second Office Action Issued in Chinese Patent Application No. 201580035737.X", dated Jul. 2, 2019, 19 Pages.

"Office Action Issued in Chinese Patent Application No. 201580035737.X", dated Sep. 27, 2019, 9 Pages.

"Office Action Issued in European Patent Application No. 15741415.2", dated Oct. 17, 2019, 5 Pages.

"Summons to Attend Oral Proceedings Issued in European Patent Application No. 15741415.2", Mailed Date: May 25, 2020, 8 Pages.

"Office Action Issued in Chinese Patent Application No. 201580035737.X", dated Apr. 28, 2020, 9 Pages.

* cited by examiner

COMPOSITING AND TRANSMITTING CONTEXTUAL INFORMATION DURING AN AUDIO OR VIDEO CALL

BACKGROUND

Mobile devices are often used to capture events as they are happening and share the events with friends or family who cannot be there in person. A typical way this is done is to capture an image and attach the image to an SMS/MMS message. Video calls are another way to share current events, and video-teleconferencing is becoming quite popular.

However, because of limited bandwidth, a video call typically sacrifices resolution to improve frame rate, which gives the remote person a "blurry" view of the world. While this may be acceptable for a traditional video call in which two people (or possibly groups) communicate over desktop or laptop computers, such a blurry view fails to work well in other scenarios.

For example, scenarios such as video-assisted shopping, apartment viewing, or lecture attendance, where the remote person may want to more carefully examine an object or the like, do not work well with blurry video calls. Such scenarios are increasingly enabled by mobile devices that take video communication into real-world environments. In general, this is because current network bandwidth connectivity limits the quality of the video signal that can be transmitted, and because mobile devices are often subject to a lot of motion as users carry and handle their mobile devices.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards receiving contextual information instead of or in addition to a default video stream during a video call or audio during an audio call, including obtaining user settings at the receiving device or at a sending device that transmits the contextual information during the audio or video call. The user settings are used by the sending device or the receiving device to determine resolution data and/or frame rate data for transmission of the contextual information. At least some received contextual information is used in displaying context during the video call.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
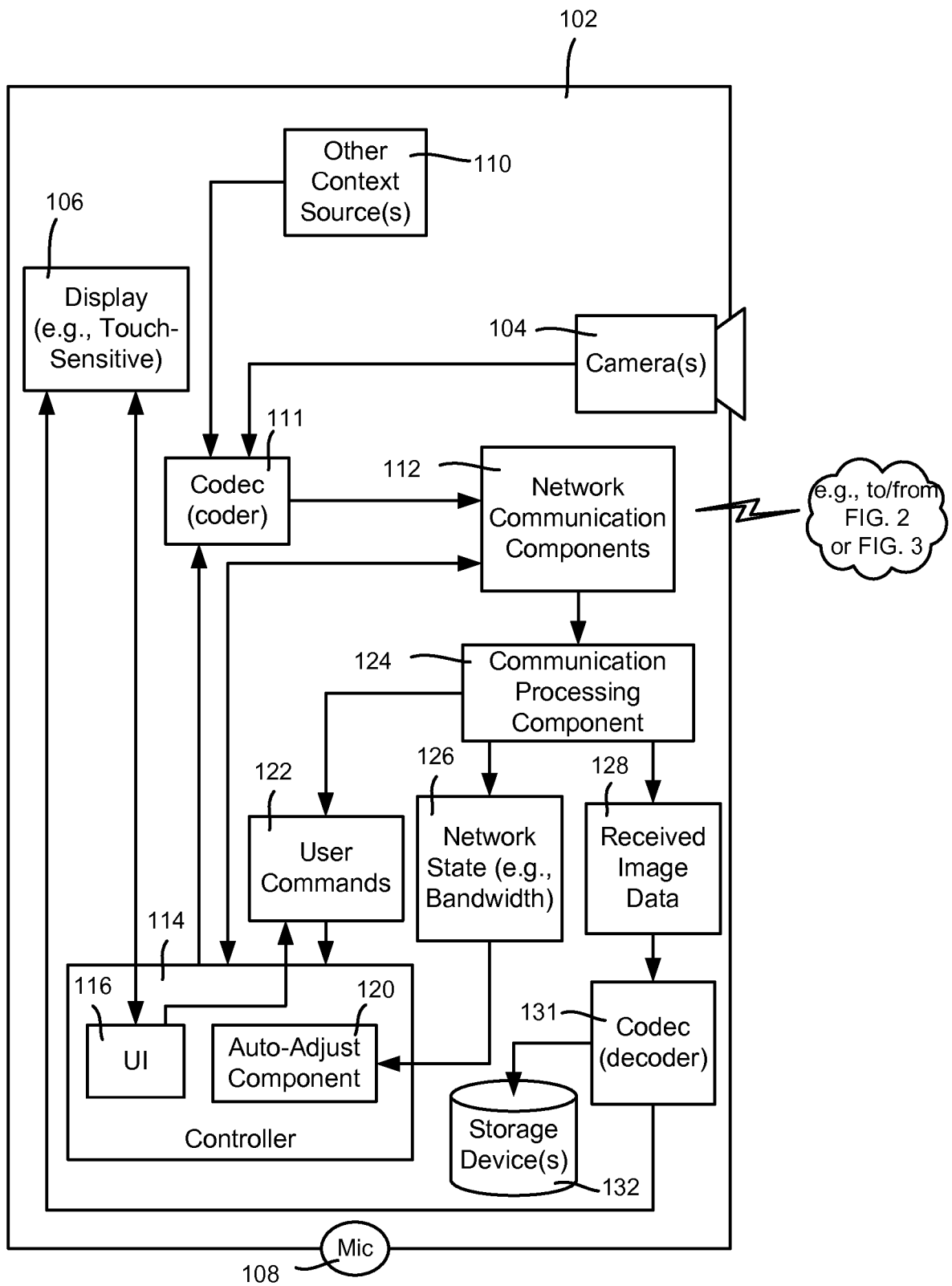
FIG. 1 is a block diagram illustrating an example device and components that may be used in transmitting and/or receiving contextual information during a video (or audio) call, according to one or more example implementations.

One or more aspects of the technology described herein are directed towards allowing contextual information to be transmitted during a video (or audio) call, in which the contextual information is mixed with or replaces (at least temporarily) the conventional video call's video (frames) in a user-controlled or automated way, or augments an audio call. As one example, a user device may send contextual information in the form of relatively high-resolution still images that replace or augment the video call frames. As another example, if multiple display devices are available to a user receiving the video call frames and contextual data, one of the users can control which display device displays the video and which displays the contextual data.

Note that as used herein, "contextual information" generally refers to information that is communicated instead of or in addition to the "default" video stream/video frames of a video call (where "default" generally refers to the video stream a user typically experiences during a conventional video call, for example). Thus, even though a default video stream also provides some context to a recipient thereof, "contextual information" and "context" as used herein generally refers to communicated/rendered data that augments or replaces the video stream during a video call. Examples of contextual information include still images, a series of images sent at a lower frame rate/higher resolution than the typical video stream, and so on. Thus, it should be noted that contextual information also may be "live video frames" or a "live video stream" to an extent, however this is not the same as the default video stream of a conventional video call, for example.

As also used herein, a "video call" is a call that communicates video information and (typically) also includes audio, although audio need not be present (e.g., hearing impaired users may have devices that do not transmit audio). An "audio call" is any call that allows person-to-person communication that is not a video call, and thus generally refers to a telephone call such as by a landline phone, VoIP phone, cell phone, computer-to-computer (e.g., without cameras) call, and so on that typically does not transmit video information; (note that there are exceptions, e.g., a fax machine and similar devices can transmit images via audible signals).

Although many of the examples described herein are directed to higher resolution images relative to the video stream's resolution, it is understood that the resolution of images communicated as part of the contextual information also may be lower than the resolution of the default video stream that may be communicated. For example, a sending user may choose to downgrade resolution as desired, such as to help preserve battery life. Similarly, a user may choose to lower a frame rate of the contextual information as desired.

In one or more aspects, the receiving user (receiving device) may control how the contextual information is sent to him or her. As one example, when bandwidth is limiting the quality of the transmitted data, a receiving user may elect to receive higher resolution images at a slower frame rate, rather than lower resolution images at a higher frame rate. In other words, the receiving user on a video call can change parameters of the video encoding used by the sending device to prioritize resolution or frame-rate. For example, the remote person or the local person on a video call has the ability to trigger the taking of high-resolution photographs and having them transmitted without needing interaction on the other end. Alternatively, the sender may be in control, at least part of the time.

In other aspects, multiple cameras or devices/sensors may capture relevant information and transmit the information to one or more remote users, e.g., as a conventional video call accompanied by one or more auxiliary video streams, streams of depth data (which may be part of a video stream), location-related data such as GPS coordinates and/or high-resolution still images. During a video call, such multiple cameras can stream information to a single output device, or multiple output devices; for example, one stream can be displayed on a television while another stream is displayed on a wall using a projector, or one stream can be displayed on a television while another stream is displayed on a tablet device, and/or one stream can be superimposed over part of the display of another stream.

The technology described herein allows such video and contextual information to be captured automatically, potentially merged with other streams, and sent to the remote user. In general, triggering the capture and/or switching among various information streams need not disrupt the flow of the conversation, (e.g., there is no lag time in switching between still images and video, or switching among cameras).

In one or more aspects, a camera may be set to automatically capture a series of high-resolution still pictures that are transmitted to a remote receiver device, which may be at a set cadence, e.g., every five seconds, or as fast as possible given available bandwidth. The remote receiving user may control additional parameters of the video interaction, without needing interaction on the local sending device. Examples include selecting which video camera (e.g., front camera, back camera, combination of front and back camera) is being transmitted. This avoids the need for someone on the local sending device to understand and act upon instructions. It also enables controlling stand-alone local devices (remote from the receiving device's perspective) that operate without any dedicated local person.

In another aspect, when sharing an activity, a remote receiving user may "miss" something happening at the local side and thus may want to look at it again, without bothering the local sending user. The technology described herein provides the ability for one user to review information from the past, such as images and/or video captured from the past, while still maintaining the video call. Thus, during a video call, a user can browse contextual information (e.g., images) and/or video captured in the past, while still participating in the live video call. A user may similarly replay contextual information (e.g., images) and/or video after a call is completed.

In general, any stream may be stored for replay during a video call. For example, a user may maintain a live video stream and roll back still images, or maintain a still image stream and roll back live video. If video is replayed and is not displayed elsewhere in real time, the audio may remain in real time to help maintain synchronization during such replay. Other mechanisms such as timelines and the like may be used to help a user recognize his or her position in a stream relative to real time.

Also described is being able to display information from the video call on any suitable display device. The remote user may view and/or play back any one or all of the various information sources on one or multiple devices, displaying the raw information (raw video or images, other information such as graphics (e.g., a full or partial screenshot) and/or synthesized information (e.g., the sender's location displayed on a map and/or geo-tagged images).

It should be understood that any of the examples herein are non-limiting. For example, the technology is generally described in the context of video and contextual information in the form of (relatively) still images and/or location-related (e.g., GPS) data, however any other type of contextual information/data such as text, graphics, animation-related data, recorded video, metadata, sensor-sensed data (e.g., motion, humidity, temperature, altitude and so on), biometric data and/or the like may be sent and received for use as desired. Further, user interface controls are exemplified in the form of interactive buttons, a slider, drop-down menus and the like, however it is understood that any type of interaction may be used, e.g., speech, gestures, eye gaze and so forth. Still further, most of the examples are directed towards video calls, but audio calls also may benefit from contextual information. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data communication in general.

FIG. 1 shows a generalized block diagram in which a device 102 is configured to act as a sending device and a receiving device with respect to a video call. To this end, the exemplified device 102 incorporates or is coupled to one or more cameras 104 that each capture images at a given frame rate and resolution. Further, the device incorporates or is coupled to one or more displays 106 (which may be touch-sensitive to receive user input). As is well-known for conventional video call communications, it is understood that audio data is also captured (via microphone/mic 108) and transmitted, and that audio data is also received and output, however for purposes of simplicity audio is generally not described hereinafter.

With respect to the one or more cameras 104, as one example, a smartphone may include front and rear cameras that each captures the same resolution images at the same frame rate, e.g., thirty frames per second. Note that although the technology described herein works with any practical number of cameras, as will be understood, a single camera may benefit from the technology described herein. For example, a single camera typically captures high resolution images, however bandwidth limitations prevent such images from being sent at high resolution at video frame rates; thus, still images at higher fidelity may be sent at a lower "frame" rate or on demand, as controlled by one of the video call participants.

As also represented in FIG. 1, one or more additional context sources 110 may be coupled to or incorporated into the device 102. Examples of additional context information sources 110 may include mechanisms that provide location data such as global positioning data, text, downloaded images, stored images, metadata and so forth. Another type of context source 110 may be a high-resolution still camera, for example, such as a camera that provides even higher resolution images than the device cameras 104.

Figure 2:
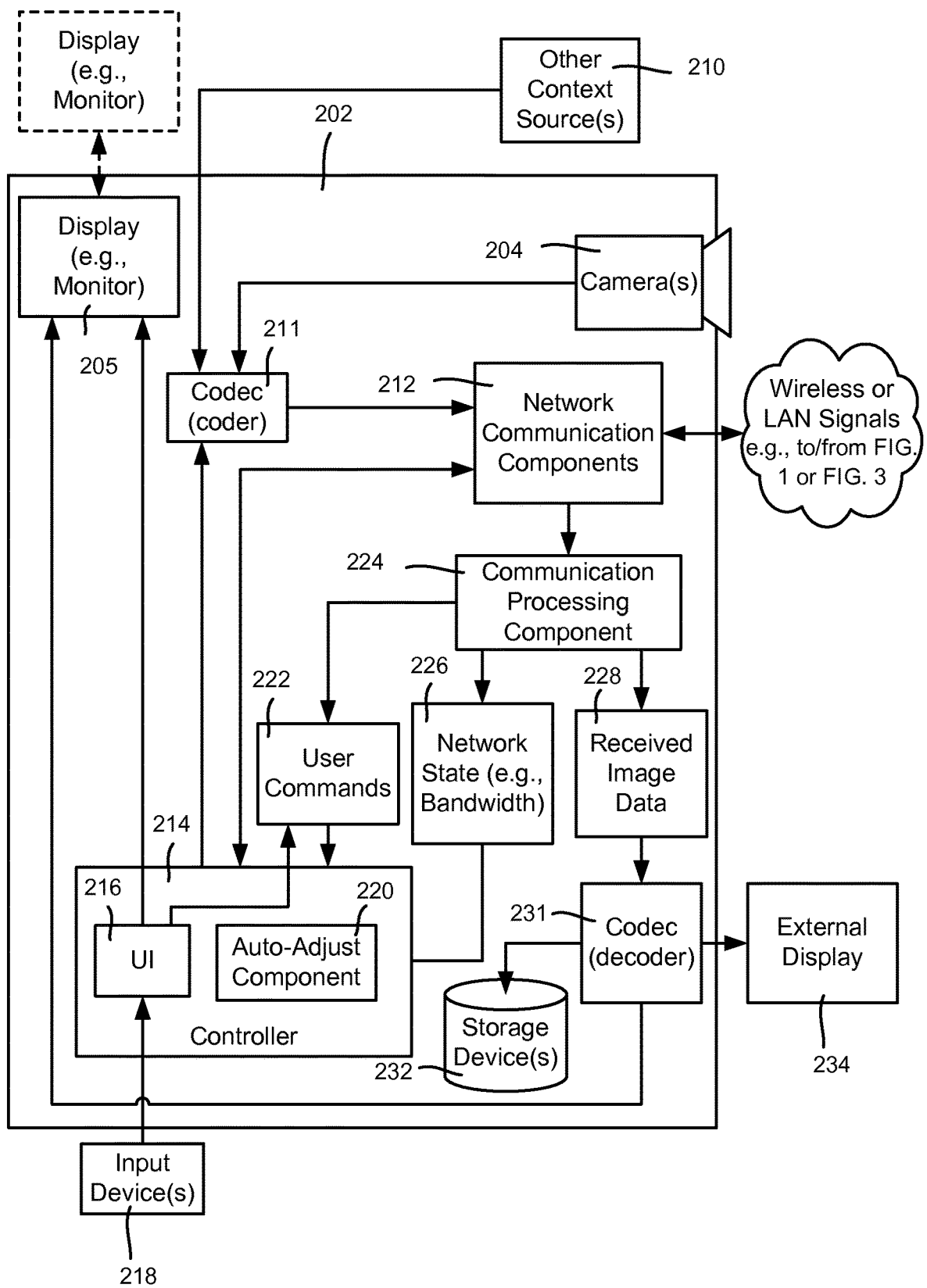
FIG. 2 is a block diagram illustrating an example alternative device and components that may be used in transmitting and/or receiving contextual information during a video/audio call, according to one or more example implementations.
Figure 3:
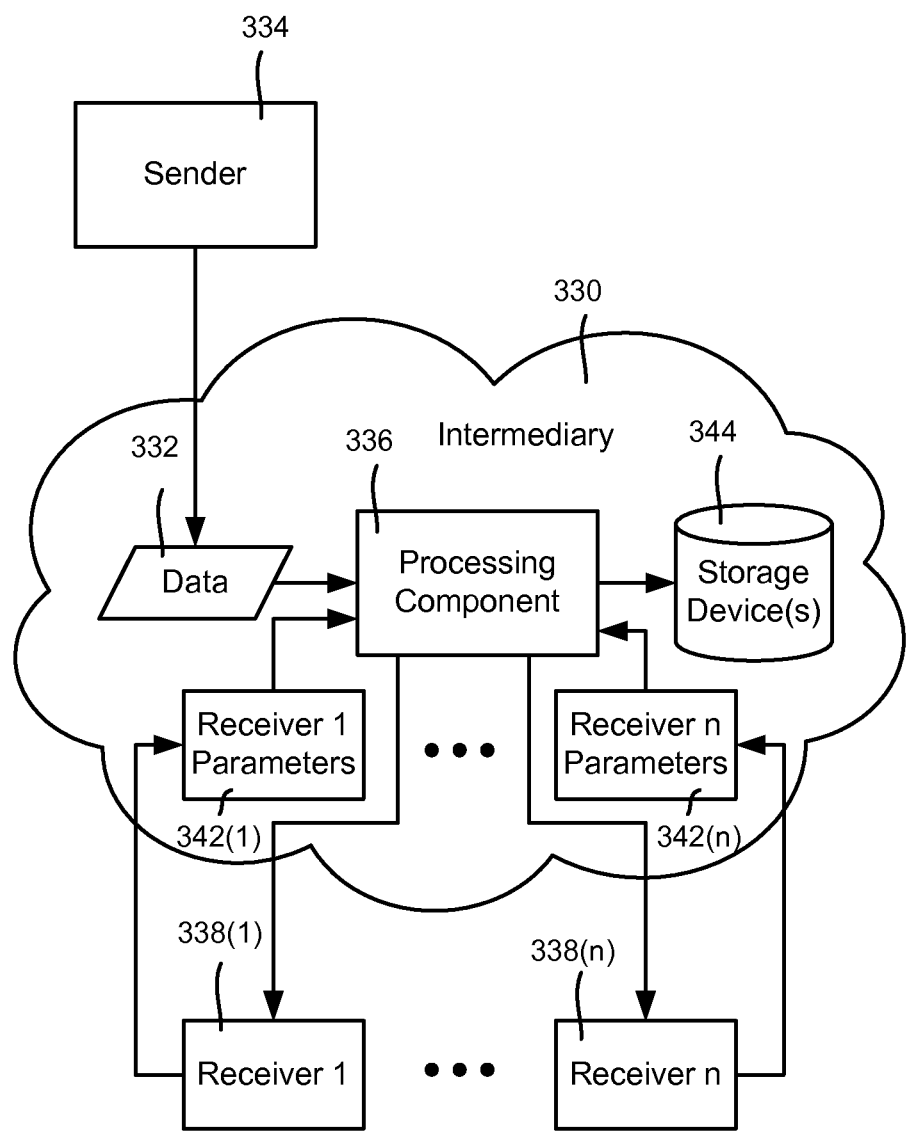
FIG. 3 is a block diagram showing how devices may communicate contextual information during a video/audio call via an intermediary, according to one or more example implementations.

In the example of FIG. 1, at least some of the data to be transmitted comprises image data that is processed by a codec (coder) 111 for sending via network communication components 112 to another device (e.g., the device 202 of FIG. 2) or to an intermediary such as the cloud (e.g., FIG. 3). A controller 114 controls the codec 110 as generally described herein to use a certain frame rate and resolution; (it is alternatively feasible for the controller 114 to select among a plurality of codecs to use one or more that are each configured (or capable of being configured) with the desired frame rate and resolution). Note that the frame rate may be zero for a given piece of contextual information, e.g., a single still image may be sent as the contextual information, which is not updated until further action is taken. A frame rate also may be variable, e.g., "as fast as possible" at a fixed resolution, for example.

As will be understood, the controller 114 may obtain the frame rate and resolution to use based upon input to a user interface 116 at the sending end, based upon automatic adjustment (component) 120 at the sending end, and/or based upon local and/or remote user commands 122, including any remote commands that may be received from a remote user that is receiving the image data. As generally represented in FIG. 1, input data received over the network a communication processing component 124 into the user commands 122, network state data 126 and received image data 128, (as well as other received data including audio, downloaded content such as maps, and so forth). As also represented in FIG. 1, the controller 114 may communicate with the remote receiving device without going through a codec, such as to send commands thereto (including commands related to received video and/or contextual information), send other contextual information such as location data thereto, receive other data therefrom, and so on.

With respect to automatic adjustment, as one example the network conditions (e.g., bandwidth) may be used to determine how image data is to be sent. For example, if no user specifies a particular resolution and frame rate, the automatic adjustment component 120 may use a default resolution and frame rate, or select one based upon the current network state 126, which may vary as conditions change. As another example, a user may request that five megapixel images be sent at whatever frame rate is currently allowed by the bandwidth; the automatic adjustment component 120 adapts the frame rate based upon the currently available bandwidth. Other examples of user interaction that adjust the resolution and/or frame rate are set forth herein.

To act as a receiving device, the exemplified device 102 includes a codec decoder 131 that is coupled to the display 106 for outputting received image data, including video call frames and/or still images. Further, the images may be stored in a storage device 132, such as for replaying any of the images as desired. Note that such playback may be at a higher resolution and/or frame rate than the real time transmission to the receiver; e.g., the receiver may download the full video/contextual data in whatever time is needed for replay. Further, the sender may use any extra bandwidth to upload missing frames and/or more data that provides higher image resolution, whereby playback may be at a higher quality/frame rate than the real time viewing.

FIG. 2 shows a device 202 that is similar to the device 102 of FIG. 1, with some variations present to emphasize the many possible configurations that may be used with the technology described herein. Components labeled 2xx in FIG. 2 are similar to those labeled 1xx in FIG. 1, and are thus generally not described again for purposes of brevity.

As one example of a variation, the display monitor 205 in FIG. 2 may or may not be touch-sensitive, or may be an externally coupled device (the dashed box). As another example, the other context source or sources 210 are shown as external to the device 202. One or more external input devices 218 are also exemplified, as is an external display 234 such as a projector or television screen.

As is understood, the components of FIGS. 1 and 2 are only non-limiting examples, and it can be readily appreciated that any component exemplified in FIG. 1 and/or FIG. 2 may be internally incorporated into the device 102 or externally coupled thereto. For example, a device such as a desktop or laptop computer may have an external video camera coupled thereto, such as a webcam, and a high-resolution still camera coupled thereto as another context source. Similarly, not all depicted components need be present in a given implementation.

Further, FIGS. 1 and 2 can operate without the video stream portion, and thus can provide a way for contextual information to accompany an audio call. As can be readily appreciated, the microphone can be turned off as well, whereby the audio call may be made in another way, e.g., by a cellular phone, by a (e.g., separate) VoIP phone device, by a landline phone, by non-cellular radio communication, and so on.

FIG. 3 shows another embodiment, in which an intermediary 330 receives at least some image data 332 from a sender 334 and may process the data (via a processing component 336) in some way before transmitting the data to one or more receiver devices 338(1)-338(n). For example, the intermediary 334 may stabilize the video call and/or mix contextual information with the video call frames. Any contextual information need not be received from the sender.

As one example of processing, consider that the sender 334 has a higher bandwidth connection to the intermediary 330 than the receiver 338(1). The sender 334 may push relatively high resolution images at a relatively high frame rate to the intermediary 330. Based upon network conditions and/or the capabilities of the receiver device 338(1), e.g., as negotiated into receiver parameters 342(1), the intermediary 330 may send the images at a lower frame rate and/or lower resolution. For example, the sender 334 may be sending images that are of a resolution that is sufficient for high definition television viewing, however the receiver device 338(1) may be a cellular telephone that does not need such fidelity, whereby the intermediary 330 may lower the resolution for this particular receiver 338(1).

The data 332 also may be stored in one or more storage devices 344 for later playback, for example. As with other playback as described above, such playback may be at a higher resolution and/or frame rate than the real time transmission to the receiver, e.g., because of more data being initially available than the receiver needed and/or because the sender filled in missing data later and/or during times of extra bandwidth. For example, a user may initially hold the video call on a smartphone, and then later play the call back on a high definition television.

Figure 4A:
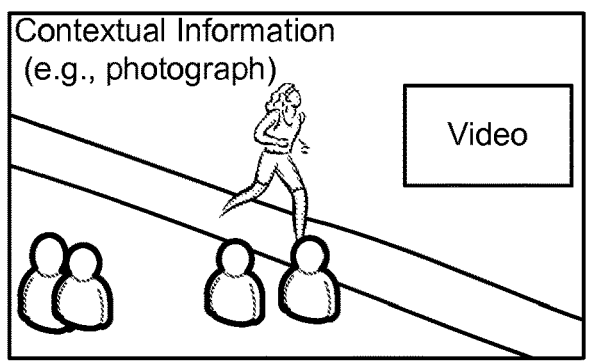
FIGS. 4A-4C are representations of how multiple displays may be configured to present contextual information along with video frames of a video call, according to one or more example implementations.
Figure 4B:
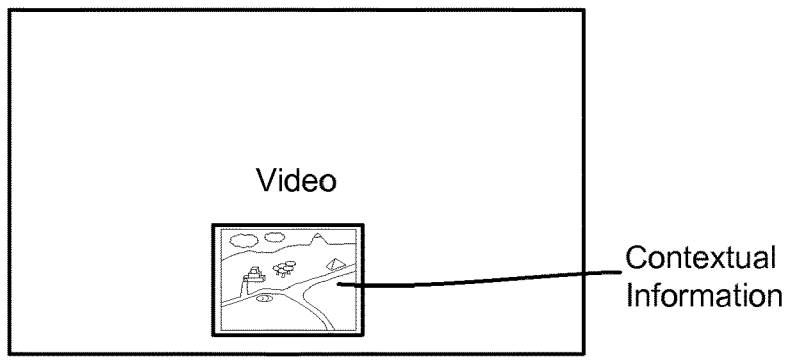
Figure 4C:
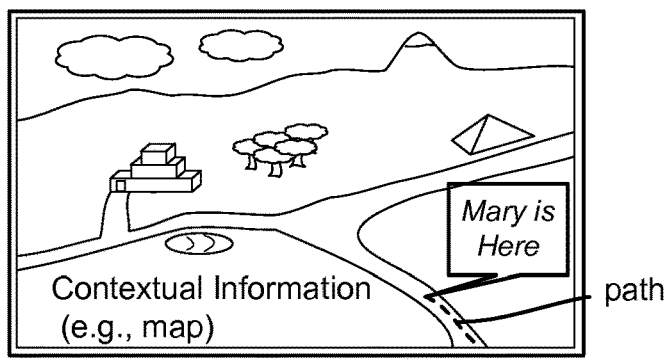
Figure 4C:

FIGS. 4A-4C provide some examples of how a user may configure one or more display devices to view a video call with accompanying contextual data. For example, FIG. 4A shows a configuration 442 in which contextual information is presented along with video from the video call in front of the contextual information. FIG. 4B is similar to FIG. 4A except that the contextual information is swapped with the video in the configuration 444. In this way, for example, a user may view a video call in conjunction with contextual information, such as one or more still images, a map that shows where the sender is currently located, and so on.

On a single display, the real-time (or recorded) video call frames may be superimposed in front of the contextual information as in FIG. 4A (or vice-versa as in FIG. 4B), such as anywhere the user wants to position the superimposed viewing area. More than one superimposed image may be present.

Alternatively, two (or more) displays may be used, in which one display may be a smaller device (e.g., a laptop computer, wearable computer, tablet computer or monitor) positioned in front of another, larger device (e.g., a television). Another display configuration may include a smaller device positioned in front of a projected display. Still further, if one of the sources is not in use or is not chosen, the user may see the contextual information (or video) that is otherwise obscured by the superimposed image or the device in front of the other. For example, if a user has a television in front of a projected image, the television blocks part of that projected image; however the user (or an automated process) may elect to have the television show the portion that is otherwise obscured, such as if the camera is not capturing anything at the time (e.g., the phone is in the user's pocket).

FIG. 4C shows another configuration 446, in which two display devices are positioned such that one generally does not obscure the other. For example, contextual information such as a map or still images may be displayed on a television or via a projector, with a smaller device such as a wearable display device or laptop or tablet held by the user.

As can be readily appreciated, more than two displays may be used, such as one showing a map, one showing the video call frames, and one showing still images. Also, two or more displays may be combined with at least one display having one or more superimposed images to provide any number of viewable display configurations.

Figure 5A:
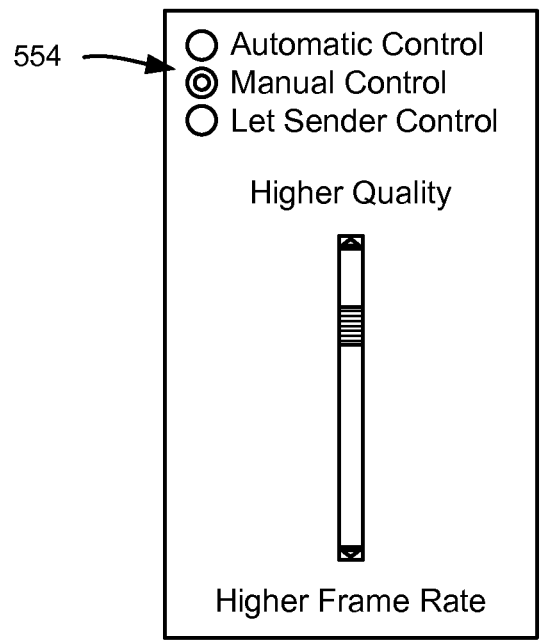
FIGS. 5A-5C are representations of example user interface elements by which a receiving user may control the presentation (e.g., fidelity, frame rate and/or camera configuration) of contextual information and/or audio or video during a call, or defer to the sender, according to one or more example implementations.
Figure 5B:
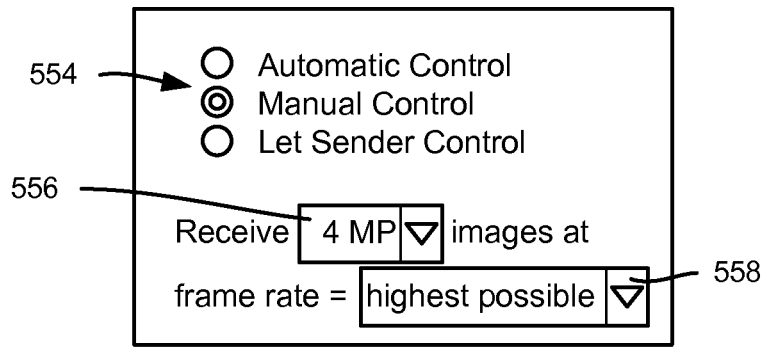
Figure 5C:
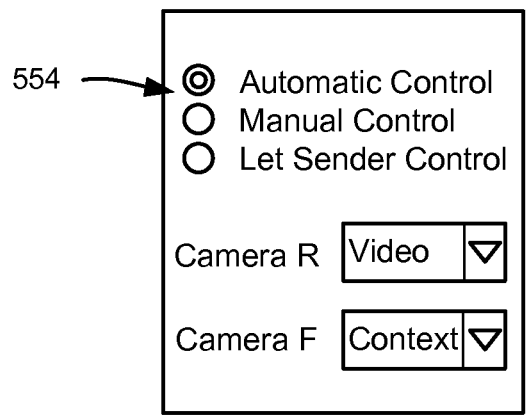

As described herein, any user may control how he or she sends or receives the transmitted content, as well as the transmission parameters (to the extent possible under the current network conditions). Any amount of information may be exchanged between the receiver and sender for this purpose, for example, including transmission parameter-related user commands 122 and 222 as described above with reference to FIGS. 1 and 2, respectively. FIGS. 5A-5C provide example user interface elements by which a remote receiving user may manually control the way contextual information is sent.

For example, FIG. 5A shows an example user interface element in the form of a slider bar 552 that allows a receiving user to trade off quality versus frame rate. For example, a remote receiving user shopping for an item may request that the sender aim the camera at the item, with the remote user selecting the highest possible quality to view a higher-resolution image of that item than is available during the typical video call's frame rate. Note that in the example of FIG. 5A, the remote receiving user has elected manual control (via a set of radio buttons 554) to accomplish this tradeoff. However, the sender may instead do this at the request of the remote user, for example, by letting the sender control the quality versus frame rate. Indeed, if the receiver device does not have such a capability, but the sender device does, the receiving user may verbally request that the sender send the video/images in the requested way and obtain the same benefit, for example.

Thus, it is readily appreciated that any action the receiving user may take may instead be taken at the sender side (as described below with reference to FIGS. 6A-6C). Conflicts may be prevented, for example, by having the receiver decide whether to defer to the sender, e.g., via the radio buttons 554 of FIGS. 5A-5C. Another suitable conflict resolution scheme alternatively may be used.

FIG. 5B provides another alternative, in which a receiving user may select the quality of contextual images, such as in a desired number of (e.g., four) megapixels via drop down menu 556. In this example, the receiving user has specified (via drop down menu 558) that the frame rate of the images be at the highest possible rate (given network conditions). However alternative selections may be made, including that the receiving user wants an image refresh after some specified number of seconds, or on demand (e.g., upon further user interaction such as a button press). The receiving user may be prevented from selecting a higher resolution and/or higher frame rate than are possible given the current network state.

FIG. 5C shows an example of how a receiving user may select what camera is showing what information. By way of example, the receiving user may select video from the sender's rear facing camera and context information (e.g., still images) from the sender's front facing camera. Other options include turning a camera off. Note that in this example, "automatic" control is selected with respect to frame rate and quality, however it is understood that such an option works with manually controlled and/or sender controlled transmissions. Such an interface element or the like allows the receiving user to change the parameters at the sender so that the camera showing context changes to showing video (e.g., lower resolution, higher-frame rate images), and/or vice-versa.

Figure 6A:
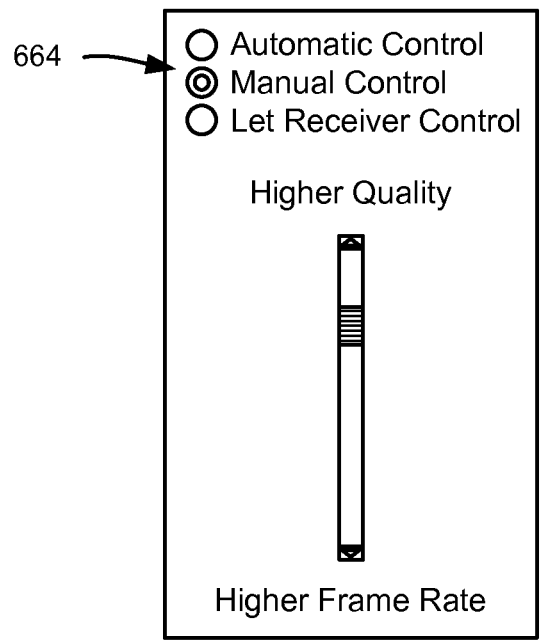
FIGS. 6A-6C are representations of example user interface elements by which a sending user may control the presentation (e.g., fidelity, frame rate and/or camera configuration) of contextual information and/or video during a call, or defer to the receiver, according to one or more example implementations.
Figure 6B:
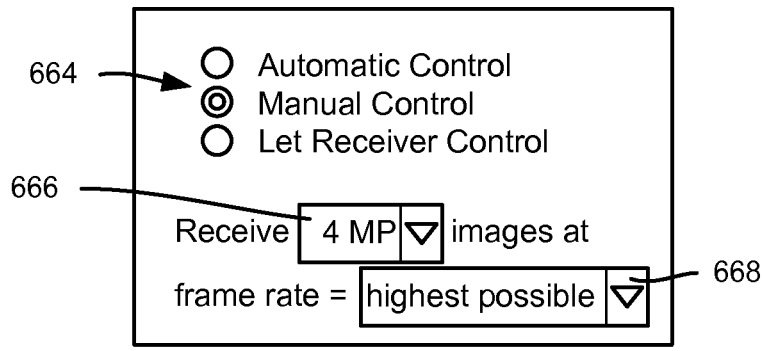
Figure 6C:
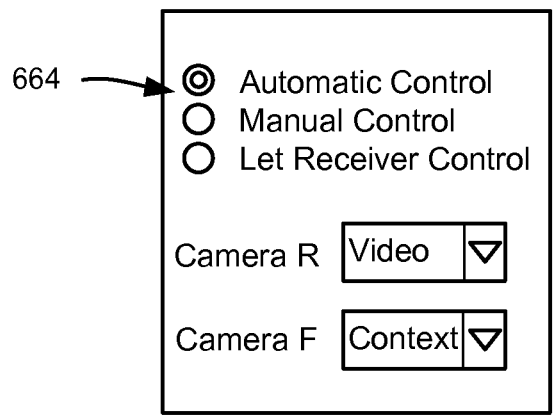

FIGS. 6A-6C are similar to FIGS. 5A-5C but are from the sender's perspective/device, and thus have an option to let the sender control. For purposes of brevity, the components are similar and as such are not repeated in detail, except to note that components labeled 55x in FIGS. 5A-5C are shown as 66x in FIGS. 6A-6C, with the sender having the option to let the receiver control. As mentioned above, an appropriate conflict resolution scheme may be used should both the sender and receiver attempt to be in control or both attempt to defer to control.

By way of an example of sending device control, consider that a user wants to provide a recipient with context information, but decides that a live video stream is not the best way (at least not completely). For instance, a sender interested in maintaining privacy may decide to send a recipient a snapshot image every thirty seconds. In another instance, a sender decides that not much is occurring and that live video is inefficient, costly, consumes battery and so on; such a sender may specify "low frame rate" until something interesting is occurring, at which time the sender may specify "high frame rate." Further, a sending user may direct both frame rate and resolution to optimize a metric unrelated to the experience; e.g., while streaming a live basketball game on half a screen while in a session, a sending user may decrease both the frame rate and the resolution of the context information to save bandwidth and/or battery.

Still further, a sender may specify that the device only sends images when a person's face is captured, or based upon some other state detectable via image processing (e.g., a scene in which there are no people). In such a situation, the frame rate may be very irregular; the system can automatically (at least to an extent) adjust the resolution as the frame rate changes, for example.

FIGS. 7A-7D show some examples of how a user may control his or her display or displays to match the received content; (note that more descriptive names that those shown may be used, and that more than two devices may be present). For example, as can be seen in the interface 770 of FIG. 7A, the user is viewing contextual information (e.g., higher resolution, slow-frame rate images) on display 1, and has turned off display 2. Note that the receiver can tell the sender not to send data to a display that is off, and thus not waste transmission bandwidth.

Figure 7A:
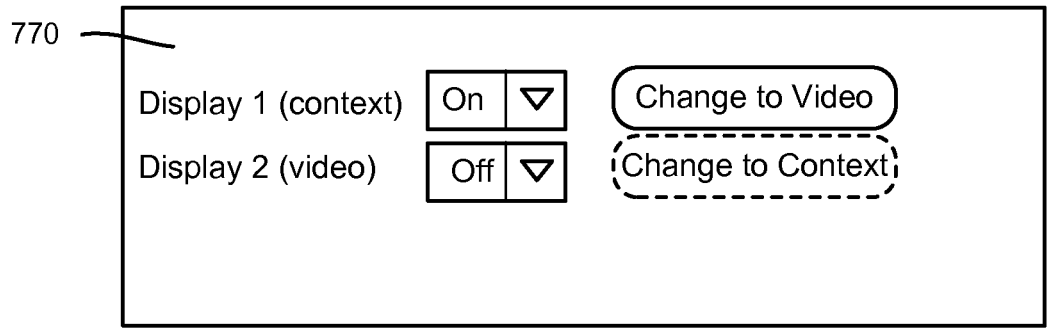
FIGS. 7A-7D are representations of example user interface elements by which a user may control how contextual information during a call may be displayed, according to one or more example implementations.
Figure 7B:
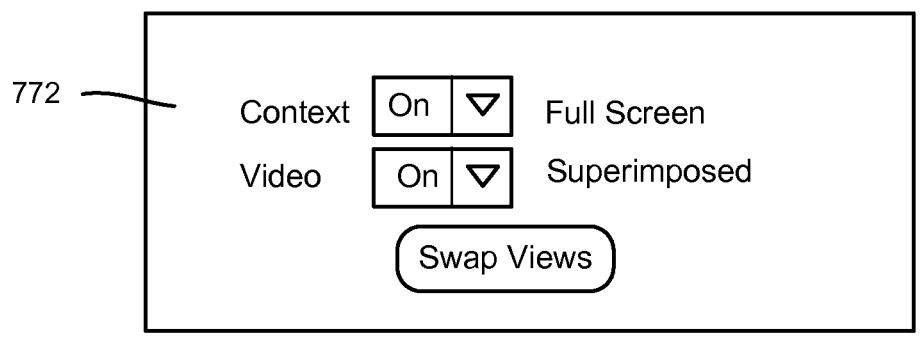

In the example user interface component 772 of FIG. 7B, both context (full screen) and video (superimposed) are being displayed on a user's single display. The user may elect to turn one (or both) off, and also to swap the views with respect to which is superimposed and which is full screen.

Figure 7C:
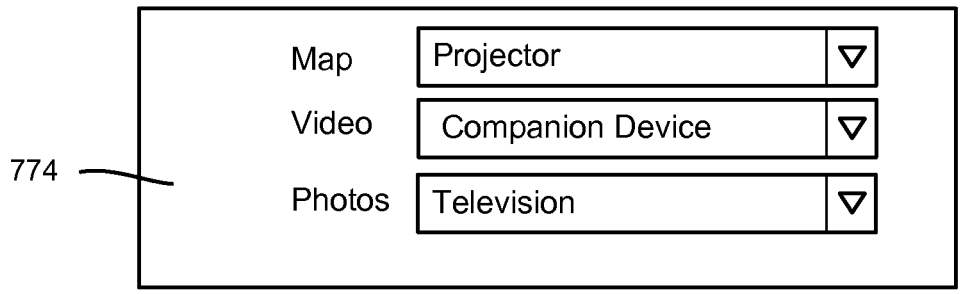

In the example user interface component 774 of FIG. 7C, the user is viewing context (a map) on a projector, video on a companion device, such as a tablet computer or wearable display, and additional context (photographs) on a television. In this example, a user has a projector, and has selected one type of context (a map) to be displayed via the projector, another type of context such as still images to be displayed on the television, and video frames to be displayed on the companion device. If, for example, additional context was available but a third display device was not available, a user may superimpose the additional context or video over an available display, view the additional context via split screen and so on.

Note that the companion device may be an audio device, including one that is not capable of showing any video. For example, a user may make a call on the audio device to another party, and separately use a computer and/or television to communicate contextual information to and/or from the other party.

Figure 7D:
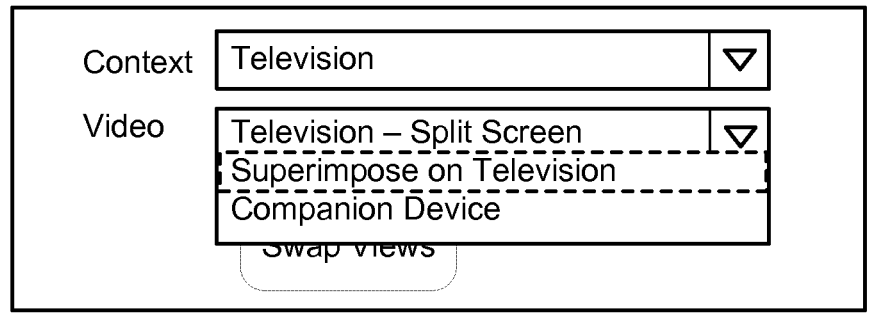

FIG. 7D shows how selection may occur. For example, if a companion device's battery is getting low, the user may elect to split the video and the context, or superimpose the video on the television. As can be readily appreciated, any practical number of physical or divided displays may be used to show any number of camera views and sources of contextual information.

As can be readily appreciated, the non-limiting examples of FIGS. 4A-4C, 5A-5C, 6A-6C and 7A-7D are only some of the possible ways a user can select and view video and/or contextual information as desired. This includes selecting how the content is viewed via one or more displays as well as how the content is viewed with respect to fidelity versus frame rate.

Figure 8A:
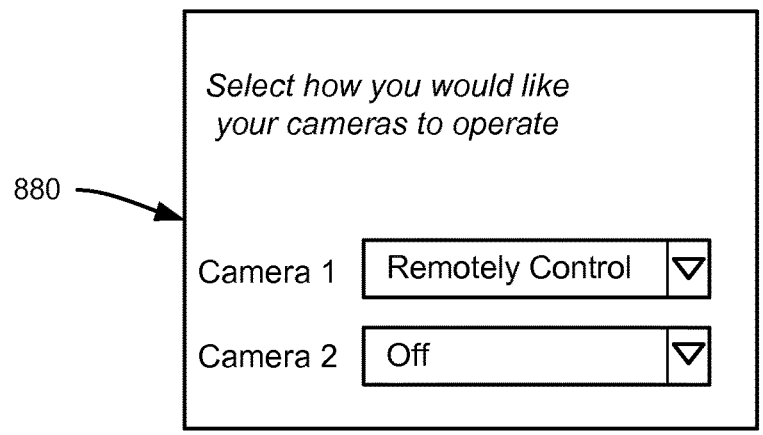
FIGS. 8A-8C are representations of example user interface elements by which a user may control the sending of contextual information and/or during a call, according to one or more example implementations.
Figure 8B:
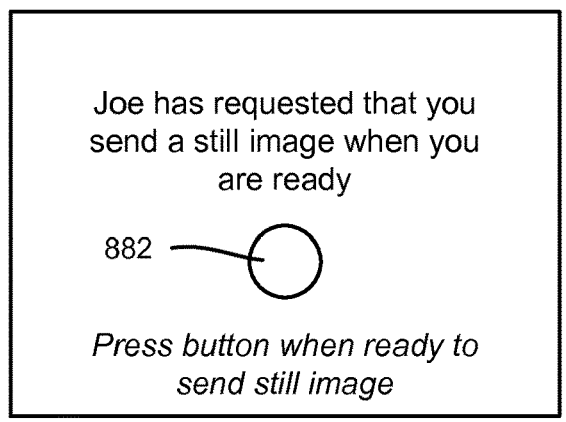
Figure 8C:
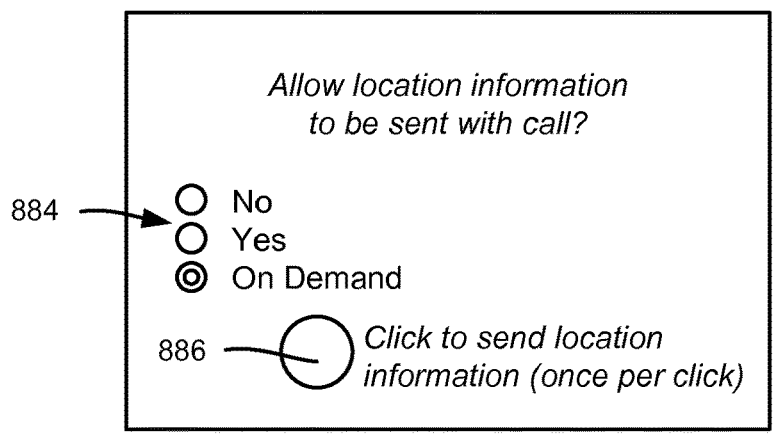

FIGS. 8A-8C are directed towards example sender side operations. As mentioned above, virtually anything done at the receiver side may be done at the sender side, however the sender may have additional controls. For example, via the example interface 880 of FIG. 8A, the sender may turn on or turn off a camera, as well as select whether the camera corresponds to sending video (lower resolution, higher frame rate) or context (higher resolution, higher frame rate). Another option is for the sender to select a setting that allows the receiver to determine the camera on-off states and/or the transmission parameters.

FIG. 8B exemplifies another interface that allows the sender to capture and send a still image on demand. For example, consider that the receiver is requesting a close up, high-resolution image of some object. To do this, FIG. 8B notifies the sender of the request, and thus allows the sender to position the camera appropriately, hold it steady, and then take an action (e.g., press the button 882) to capture the image when the sender feels everything is correct. Note that it is possible for the receiver to initiate a capture as well.

Thus, a remote receiving user may indicate to a sending device that he or she would like a picture taken or video parameters adjusted. In one implementation this may be a new button in an existing video call (e.g., Skype®) interface. In an alternative implementation this may be a special text command typed by the user. In another alternative implementation the remote user may use a button, gesture, speech, EEG monitor, or other auxiliary device to interpret the local user's intentions and issue a request or command.

FIG. 8C is another example of sender control. Consider that the receiver has a map and wants to know where the sender is. Via the exemplified radio buttons 884, the sender may elect to not disclose the location, or disclose it regularly such as every few seconds or at a rate that is dependent on the sender's current traveling speed. Another option is for the sender to only send the location data on demand, (e.g., via button 886) when ready.

Figure 9:
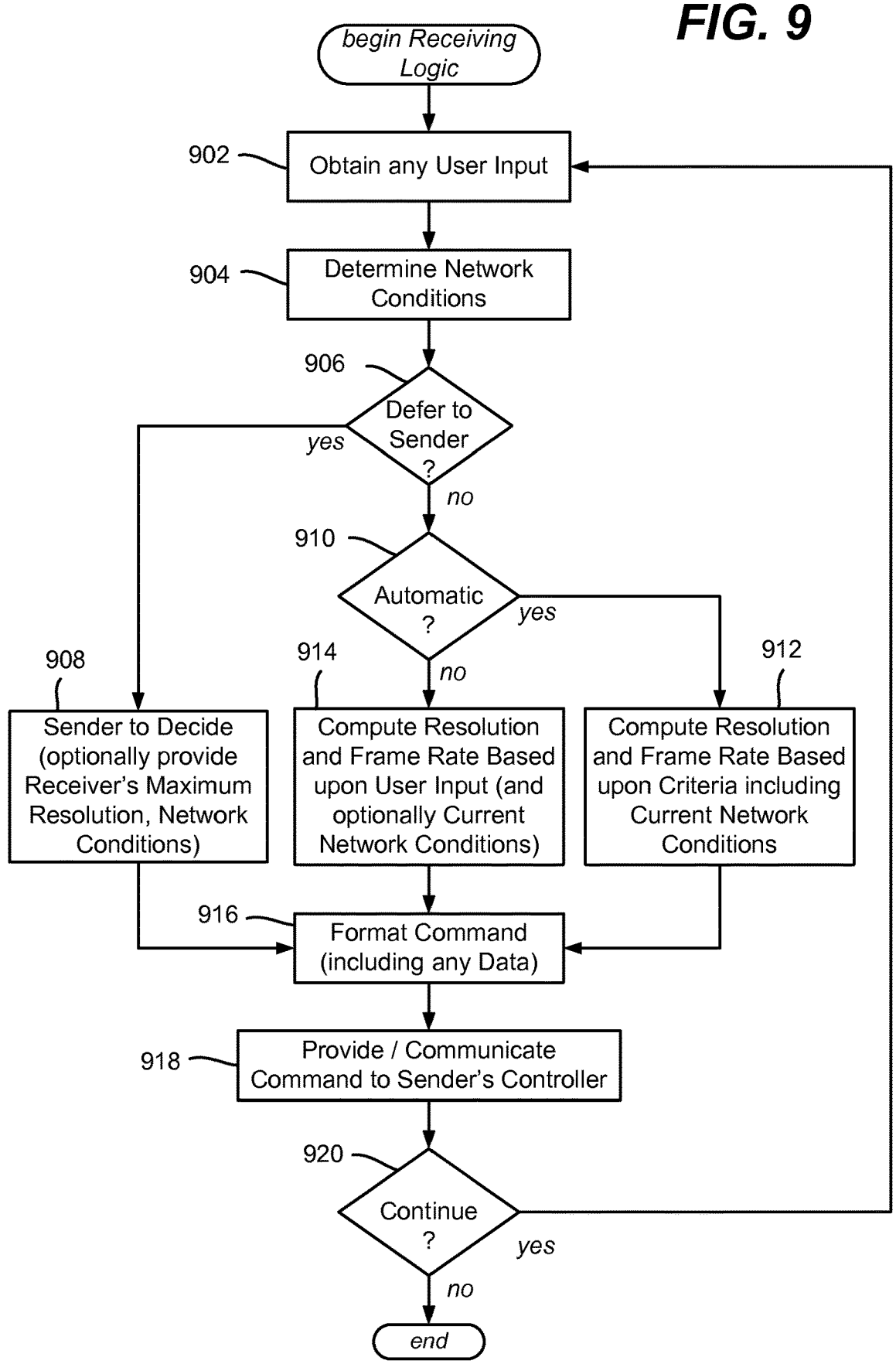
FIG. 9 is an example flow diagram representing example logic/steps that a device may use with respect to receiving contextual information, according to one or more example implementations.

FIG. 9 is a flow diagram representing example steps/logic that may be used with respect to when a device is acting as a receiver, beginning at step 902 where user input, if any, is obtained. At step 904 current the network state (conditions) are determined/obtained. As can be readily appreciated, the order of at least some of the example steps in FIG. 9 may be varied.

Step 906 evaluates whether the receiver's user has decided to defer the transmission decisions/parameters (e.g., what camera(s), resolution(s), frame rate(s) and any other selectable options) to the sender. If so, step 908 (along with steps 916 and 918) notifies the sender of this decision, and may provide information to assist the sender, e.g., including the receiver device's maximum resolution and/or the receiver's network conditions. If deferred to the sender, step 916 represents the sender's local UI component and/or local profile settings, along with (possibly) any other available data such as network state and remotely provided information, being used for formatting the command, which are provided to the sender's controller for use at step 918.

If the receiving user does not choose to defer to the sender, the receiving user may elect to use automatic settings (which may be by default or via saved user preference settings) via steps 910 and 912. In general, step 912 computes a resolution and frame rate based upon any suitable criteria including current network conditions. In this way, a user may simply participate in a video call without any particular interaction with respect to selecting parameters.

Note that another setting that may be communicated may notify the sender of how to handle a reduced network bandwidth condition. For example, a user may request an eight megapixel image be sent every five seconds, and further specify how to send images if that is not possible given the bandwidth. For example, a user may request that the sender throttle the frame rate if the image cannot be sent at the desired rate, or compress the resolution but keep the rate steady, or specify a combination of throttled frame rate and compressed resolution (which if chosen may be automatically computed).

Further note that step 912 allows a user to use saved automatic settings, such that during typical network conditions a user may repeat a previous experience. Sets of saved settings may be associated with a profile or the like, e.g., a "Shopping" profile may automatically show higher resolution images at a low frame rate with a small live video superimposed over part of the image, whereas a "Map" profile may automatically choose to display a relatively static map in the background that shows the sender's current location along with video (lower-resolution images at a high frame rate). Note however that a user can change the current settings at any time during a call, subject to bandwidth limitations.

As represented by step 914, the user may provide user input to change any settings, including to override any default or previous settings. By way of example, the user interface elements exemplified in FIGS. 5A-5C may be interacted with before or during a call to provide the user with a desired experience.

Steps 916 and 918 represent formatting and providing (communicating), respectively, the appropriate command that may include any corresponding data to the controller. If receiving device control is occurring, virtually any agreed-upon command structure/protocol may be used to communicate the command to the sending device, and to return the resulting video and/or contextual information (as well as optionally an acknowledgment of the changes in video parameters) to the requesting user receiving device. For example, in one implementation, such a protocol may be layered on top of the existing video call command protocol. In another implementation the communication/protocol may be over a separate network connection between the sending and receiving devices.

In addition to frame rate and/or resolution requests, device capabilities may be exchanged, negotiated and so forth. Further, other information that may be of use to the sender and/or receiver may be communicated, such as device battery state, amount of data plan used/remaining, display screen size, and so forth. Camera control commands such as zoom, pan, roll, focus and so forth also may be sent.

Step 920 repeats the process during the call. This allows the user to interactively change settings and also allows adapting to changing network conditions.

As can be seen in the example of FIG. 9, the receiving side may defer the setting selections to the sender, or may choose to be in charge of the transmission, whether automatic or manual, such as exemplified in the following table:

| In Charge? | Action |
|---|---|
| Sender | Notify sender to decide (optionally provide maximum resolution, etc.) |
| Receiver (Automatic) | Look up or compute desired frame rate and resolution based upon appropriate criteria; instruct sender to use desired frame rate and resolution (and whether to lower resolution and/or lower frame rate if needed). |
| Receiver (Manual) | Notify sender of desired resolution and frame rate based upon user input; instruct sender to use desired frame rate and resolution (and whether to lower resolution and/or lower frame rate if needed). |

Figure 10:
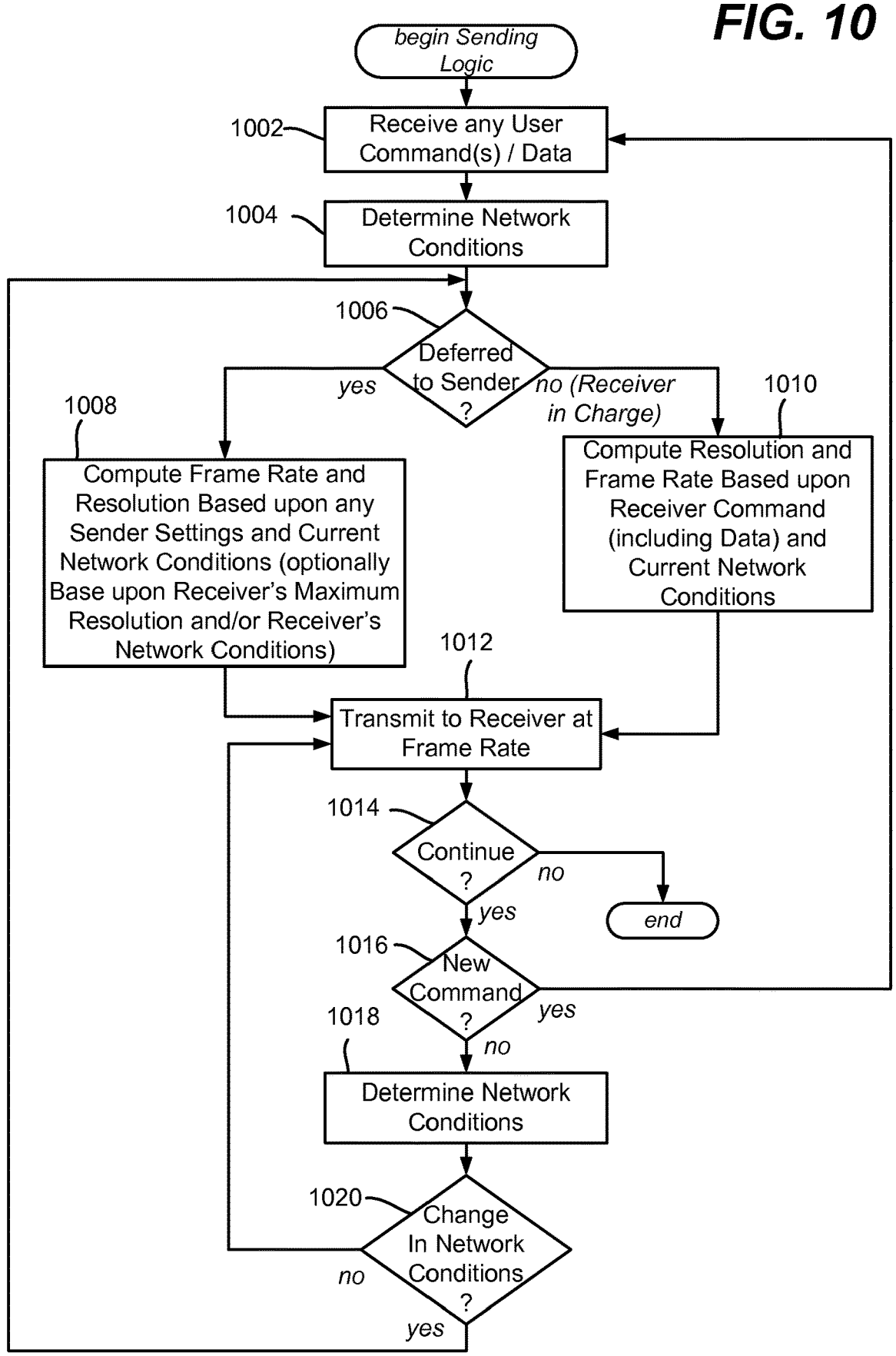
FIG. 10 is an example flow diagram representing example logic/steps that a device may use with respect to sending contextual information, according to one or more example implementations.

FIG. 10 represents example steps/logic that may be used when a device is sending data and thus acting as the sender side relative to the receiver, beginning at step 1002 where any user commands and data are obtained. Step 1004 represents determining/obtaining the current network conditions. Note that the sender's current network conditions may not be the same as the receiver's network conditions, including if an intermediary is present (e.g., FIG. 3).

Step 1006 evaluates whether the other (receiving) user has deferred to the sender with respect to how the data is to be sent. As mentioned above, this is the default condition if a receiving device does not have the logic to communicate commands to the sender, (other than for example verbally or via text messaging by the user), and can also be used if the receiving user does not want to interact to change settings or does not understand how to do so.

If deferred to the sender, step 1008 computes the frame rate and resolution based upon any sender settings (which may be default settings and/or saved settings) and current network conditions. The frame rate and resolution optionally may be based upon the receiver's maximum resolution and/or the receiver's network conditions, as well as possibly other information such as receiver display size. Note that a separate computation may be made for video data and contextual information, e.g., balanced among the available bandwidth.

If not deferred to the sender, step 1008 represents using the receiver's commands/data to compute the resolution and frame rate based upon the current network conditions. As described herein, this allows the receiving user to view video and/or contextual information in a desired way, including making any adjustments during the video call. Note that a receiving user can change to taking control during the call versus deferring to the sender (and vice-versa).

Step 1012 represents transmitting the video and/or contextual information at the computed frame rate (or rates). If video and contextual information are being sent, the data may be mixed onto one channel and later divided, or transmitted on separate channels. Step 1014 continues the process until the call is ended.

Step 1016 represents evaluating whether a new command has been received from the receiving user device. If so, the process repeats from step 1002, which allows the receiving user to adjust the transmission settings during the call.

Steps 1018 and 1020 allow for changing network conditions. Step 1020, which evaluates whether the network conditions have changed, may only consider the network conditions changed if the conditions change the computations sufficiently to change the resolution and/or frame rate. If no new command is received from the receiver and the network conditions are not such that the resolution and/or frame rate need to be changed, step 1012 is repeated to continue to send the image data and/or any non-image contextual data at the desired rate.

As can be seen in the example of FIG. 10, the sending side may be told to make the setting selections, or may use those sent by the receiving side, such as exemplified in the following table:

| In Charge? | Action |
| --- | --- |
| Sender | Compute desired frame rate and resolution based upon current network conditions and send (may use maximum receiver resolution, if known, to cap resolution) |
| Receiver | Use receiver's instructions to compute resolution and frame rate for current network conditions and send |

As can be seen, one or more aspects of the technology described herein facilitates receiving contextual information during an audio or video call. This may include obtaining user settings at the receiving device or at a sending device that transmits the contextual information during the call, in which the user settings are used by the sending device or the receiving device to determine resolution data and/or frame rate data for transmission of the contextual information. The received contextual information may be used to display context during the call. For example, displaying the context may comprise rendering a visible representation of the contextual information to one display device, and, if a video call, outputting video of the video call to another display device.

The resolution data and/or the frame rate data may be determined from the user settings by accessing saved profile information.

In one aspect, if the call is a video call, the contextual information may be received as at least one image in addition to the default video stream received during the video call. The contextual information may be received as a series of images at an image frame rate and an image resolution, in which the image frame rate is lower than a video frame rate of the default video stream received during the video call, and in which the image resolution is higher than a resolution of the video frames received during the video call.

The contextual information may comprises a plurality of images; the user settings may be obtained by providing a user interface including at least one interactive control by which a user may a) increase or decrease image resolution of the images, b) increase or decrease a frame rate of receiving the images, c) decrease image resolution of the images while increasing a frame rate of receiving the images, or d) increase image resolution of the images while decreasing a frame rate of receiving the images.

Information may be provided to the sending device to instruct the sending device to capture an image, or to instruct a user of the sending device to initiate capture of an image.

The contextual information may be stored for replay during the call and/or after the call.

One or more aspects are directed towards a controller component coupled to or incorporated into a sending device configured to participate in a video call with a receiving device. The controller component is configured to control transmission of contextual image information during the video call, including to control a resolution and frame rate for the contextual image information based at least in part upon one or more commands obtained at the sending device locally, or obtained from the receiving device. For example, the controller component may be coupled to a codec to control the transmission of the contextual image via one or more parameters provided to the codec. The controller component may control the transmission of the contextual image by selection of a codec. The controller may obtain or determine network state data, and adjust the resolution and/or frame rate of the contextual image information, based at least in part on the network state data.

The sending device may be coupled to (and/or incorporate) cameras, wherein the controller component controls sending of an image stream for each camera, including via control of at least one codec. The device may be coupled to the remote recipient via an intermediary that processes at least part of the contextual image information or video, or both, for transmission to the remote recipient.

One or more aspects are directed towards controlling transmission of contextual information during an audio or video call. The contextual information is transmitted between a sending device that sends the contextual information and a receiving device that receives the contextual information. One or more commands at the sending device may be used to control frame rate data and/or resolution data for transmitting the contextual information. The contextual information may be recorded for playing back the contextual information. The frame rate data may be computed based at least in part upon a desired resolution and/or network state data, and/or user settings from saved profile data.

The sending device may a) decrease the resolution to maintain the frame rate if available bandwidth is insufficient, b) decrease the frame rate to maintain the resolution if available bandwidth is insufficient, c) decrease the resolution and decrease the frame rate, d) increase the resolution while decreasing or maintaining the frame rate, e) increase the frame rate while decreasing or maintaining the resolution, or f) increase the frame rate and increase the resolution.

Example Operating Environment

It can be readily appreciated that the above-described implementation and its alternatives may be implemented on any suitable computing device, including a mobile phone, gaming/entertainment system, personal (e.g., laptop or desktop) computer, tablet computing device, handheld computing device, DVR, set-top television box, wearable computing device and/or the like. Combinations of such devices are also feasible when multiple such devices are linked together. For purposes of description, a smartphone is described as an example operating environment hereinafter.

Figure 11:
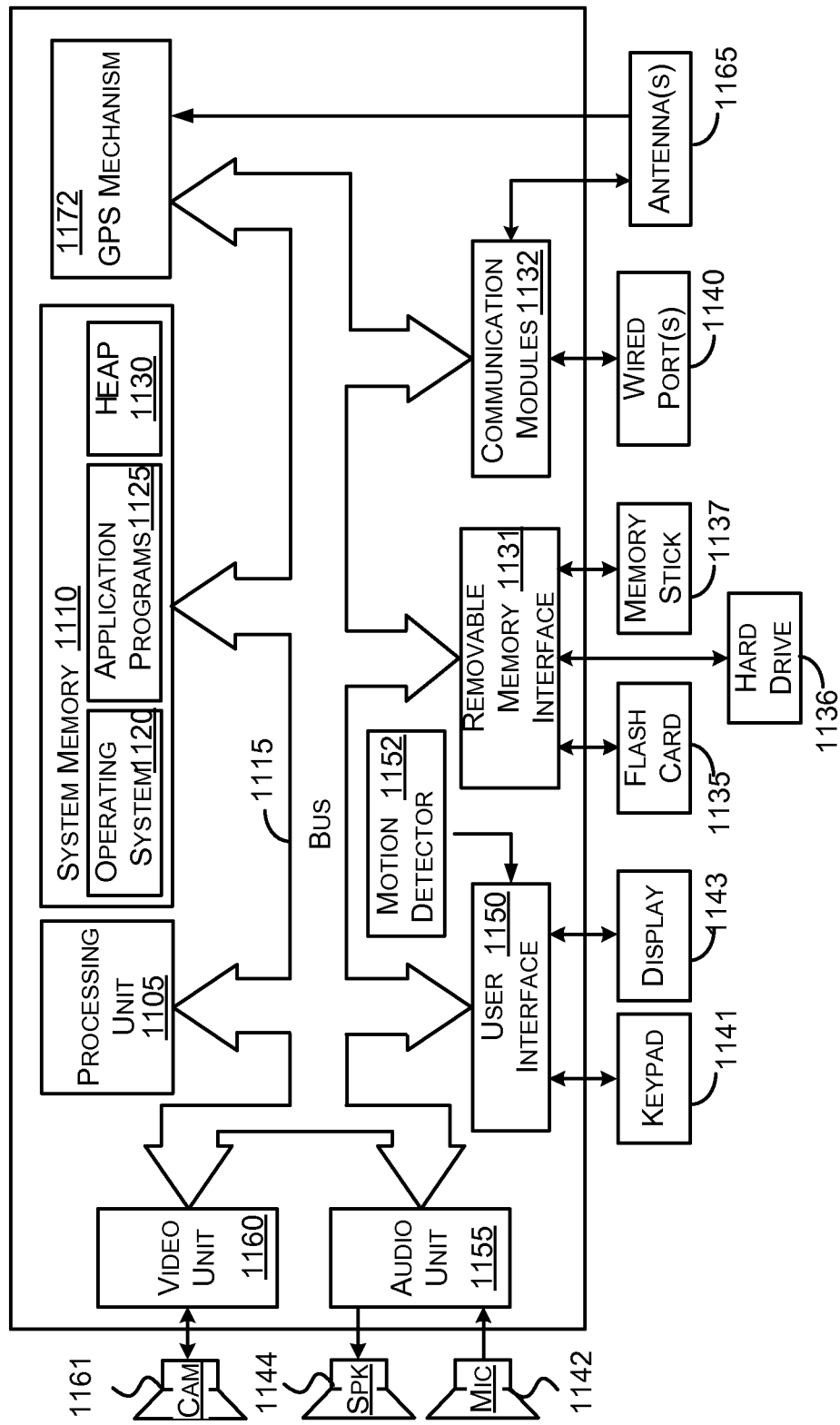
FIG. 11 is a block diagram representing an example non-limiting computing system and/or operating environment into which one or more aspects of various embodiments described herein can be implemented.

FIG. 11 illustrates an example of a suitable device 1100, such as a mobile device, on which aspects of the subject matter described herein may be implemented. The device 1100 is only one example of a device and is not intended to suggest any limitation as to the scope of use or functionality of aspects of the subject matter described herein. Neither should the device 1100 be interpreted as having any dependency or requirement relating to any one or combination of components illustrated in the example device 1100.

With reference to FIG. 11, an example device for implementing aspects of the subject matter described herein includes a device 1100. In some embodiments, the device 1100 comprises a cell phone, a handheld device that allows voice communications with others, some other voice communications device, or the like. In these embodiments, the device 1100 may be equipped with a camera for taking pictures, although this may not be required in other embodiments. In other embodiments, the device 1100 may comprise a personal digital assistant (PDA), hand-held gaming device, notebook computer, printer, appliance including a set-top, media center, personal computer, or other appliance, other mobile devices, or the like. In yet other embodiments, the device 1100 may comprise devices that are generally considered non-mobile such as personal computers, computer with large displays (tabletop and/or wall mounted displays and/or titled displays), servers or the like.

Components of the device 1100 may include, but are not limited to, a processing unit 1105, system memory 1110, and a bus 1115 that couples various system components including the system memory 1110 to the processing unit 1105. The bus 1115 may include any of several types of bus structures including a memory bus, memory controller, a peripheral bus, and a local bus using any of a variety of bus architectures, and the like. The bus 1115 allows data to be transmitted between various components of the mobile device 1100.

The mobile device 1100 may include a variety of computer-readable media. Computer-readable media can be any available media that can be accessed by the mobile device 1100 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1100.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 1110 includes computer storage media in the form of volatile and/or nonvolatile memory and may include read only memory (ROM) and random access memory (RAM). On a mobile device such as a cell phone, operating system code 1120 is sometimes included in ROM although, in other embodiments, this is not required. Similarly, application programs 1125 are often placed in RAM although again, in other embodiments, application programs may be placed in ROM or in other computer-readable memory. The heap 1130 provides memory for state associated with the operating system 1120 and the application programs 1125. For example, the operating system 1120 and application programs 1125 may store variables and data structures in the heap 1130 during their operations.

The mobile device 1100 may also include other removable/non-removable, volatile/nonvolatile memory. By way of example, FIG. 11 illustrates a flash card 1135, a hard disk drive 1136, and a memory stick 1137. The hard disk drive 1136 may be miniaturized to fit in a memory slot, for example. The mobile device 1100 may interface with these types of non-volatile removable memory via a removable memory interface 1131, or may be connected via a universal serial bus (USB), IEEE 10394, one or more of the wired port(s) 1140, or antenna(s) 1165. In these embodiments, the removable memory devices 1135-1137 may interface with the mobile device via the communications module(s) 1132. In some embodiments, not all of these types of memory may be included on a single mobile device. In other embodiments, one or more of these and other types of removable memory may be included on a single mobile device.

In some embodiments, the hard disk drive 1136 may be connected in such a way as to be more permanently attached to the mobile device 1100. For example, the hard disk drive 1136 may be connected to an interface such as parallel advanced technology attachment (PATA), serial advanced technology attachment (SATA) or otherwise, which may be connected to the bus 1115. In such embodiments, removing the hard drive may involve removing a cover of the mobile device 1100 and removing screws or other fasteners that connect the hard drive 1136 to support structures within the mobile device 1100.

The removable memory devices 1135-1137 and their associated computer storage media, discussed above and illustrated in FIG. 11, provide storage of computer-readable instructions, program modules, data structures, and other data for the mobile device 1100. For example, the removable memory device or devices 1135-1137 may store images taken by the mobile device 1100, voice recordings, contact information, programs, data for the programs and so forth.

A user may enter commands and information into the mobile device 1100 through input devices such as a key pad 1141, which may be a printed keyboard, and the microphone 1142. In some embodiments, the display 1143 may be a touch-sensitive screen (or even support pen and/or touch) and may allow a user to enter commands and information thereon. The key pad 1141 and display 1143 may be connected to the processing unit 1105 through a user input interface 1150 that is coupled to the bus 1115, but may also be connected by other interface and bus structures, such as the communications module(s) 1132 and wired port(s) 1140. Motion detection 1152 can be used to determine gestures made with the device 1100.

A user may communicate with other users via speaking into the microphone 1142 and via text messages that are entered on the key pad 1141 or a touch sensitive display 1143, for example. The audio unit 1155 may provide electrical signals to drive the speaker 1144 as well as receive and digitize audio signals received from the microphone 1142.

Indeed, with respect to manual control, a user may use any of various interactive modalities as an input device, such as a mouse, touch-screen, game controller, remote control and so forth. Speech and/or gestures may be detected to control the settings. Control may be facilitated by conventional interfaces such as a mouse, keyboard, remote control, or via another interface, such as Natural User Interface (NUI), where NUI may generally be defined as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other categories of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, as well as technologies for sensing brain activity using electric field sensing electrodes.

The mobile device 1100 may include a video unit 1160 that provides signals to drive a camera 1161. The video unit 1160 may also receive images obtained by the camera 1161 and provide these images to the processing unit 1105 and/or memory included on the mobile device 1100. The images obtained by the camera 1161 may comprise video, one or more images that do not form a video, or some combination thereof.

The communication module(s) 1132 may provide signals to and receive signals from one or more antenna(s) 1165. One of the antenna(s) 1165 may transmit and receive messages for a cell phone network. Another antenna may transmit and receive Bluetooth® messages. Yet another antenna (or a shared antenna) may transmit and receive network messages via a wireless Ethernet network standard.

Still further, an antenna may provide location-based information, e.g., GPS signals to a GPS interface and mechanism 1172. In turn, the GPS mechanism 1172 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 1100 may connect to one or more remote devices. The remote devices may include a personal computer, a server, a router, a network PC, a cell phone, a media playback device, a peer device or other common network node, and typically includes many or all of the elements described above relative to the mobile device 1100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

Still further, any or all of the components or the like described herein may be implemented in storage devices as machine executable code, and/or in hardware/machine logic, whether local in one or more closely coupled devices or remote (e.g., in the cloud), or a combination of local and remote components, and so on.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for augmenting person-to-person communication, the method comprising:
   obtaining user settings for a receiving device;
   initiating a call between a sending device and the receiving device, the call comprising a video stream;
   determining, by the receiving device, contextual information to be sent with the video stream from the sending device during the call based upon the obtained user settings, the contextual information comprising an additional video stream;
   receiving, by the receiving device, the contextual information separate from the video stream during the call; and
   displaying, by the receiving device, the received contextual information separate from the video stream during the call.

2. The method of claim 1, wherein receiving the contextual information further comprises receiving a series of images at an image frame rate and an image resolution, in which the image frame rate is lower than a video frame rate of the video stream received during the video call, and in which the image resolution is higher than a resolution of a video frame for the video stream received during the video call.

3. The method of claim 1 wherein the contextual information comprises a plurality of images, and wherein obtaining the user settings further comprises one of the following:
   increasing or decreasing image resolution of the images;
   increasing or decreasing a frame rate of receiving the images;
   decreasing image resolution of the images while increasing a frame rate of received images; or
   increasing image resolution of the images while decreasing a frame rate of the images.

4. The method of claim 1, further comprising instructing, by the receiving device during the call, the sending device to capture an image and send the captured image to the receiving device.

5. The method of claim 1 further comprising storing the contextual information for replay.

6. The method of claim 1, wherein displaying the contextual information further comprises rendering a visible representation of the contextual information to one display device, and outputting video of the video stream to another display device.

7. The method of claim 1 wherein the contextual information and the video stream are displayed at the receiving device at a same time.

8. A system for augmenting person-to-person communication, the system comprising:
a controller component coupled to or incorporated into a sending device configured to participate in a call comprising video with a receiving device, the controller component configured to:
receive user settings for the receiving device;
determine, based upon the received user settings, contextual information to be sent from the sending device to the receiving device during the call, the contextual information comprising an additional video stream; and
transmit the contextual information separate from the video during the call to the receiving device from the sending device.

9. The system of claim 8 wherein the controller component is coupled to a codec, and the controller component controls the transmission of the contextual information via one or more parameters provided to the codec.

10. The system of claim 8 wherein the controller component is further configured to control a resolution and a frame rate for video information sent to the receiving device.

11. The system of claim 8 further comprising:
at least one camera coupled to or incorporated in the sending device; and
the controller component further configured to control sending of an image stream for the at least one camera via control of at least one codec.

12. The system of claim 8 wherein the controller is further configured to:
obtain or determine network state data; and
adjust a resolution or a frame rate of the contextual information based upon the network state data.

13. The system of claim 8 wherein the sending device is configured to transmit other contextual information to the receiving device.

14. The system of claim 13 wherein the other contextual information comprises one or more of the following: location-related data, text, graphics, animation-related data, depth data, biometric data, sensor-sensed data, recorded video, and metadata.

15. The system of claim 8 wherein the sending device is coupled to the receiving device via an intermediary that processes one or more of the following: the contextual information and video for transmission to the receiving device.

16. One or more machine-readable storage devices including executable instructions, that upon execution perform operations for augmenting person-to-person communication by:
receiving user settings for a receiving device;
initiating a video call between a sending device and the receiving device, the video call comprising a video stream;
determining contextual information to be sent from the sending device to the receiving device during the video call based upon the user settings, the contextual information comprising an additional video stream; and
transmitting the contextual information separate from the video stream from a sending device to the receiving device during the video call.

17. The one or more machine-readable storage devices of claim 16 having further executable instructions comprising recording the contextual information, and playing back the contextual information.

18. The one or more machine-readable storage devices of claim 16 having further executable instructions comprising computing a frame rate data based at least in part upon one of more of the following: a desired resolution, a network state data, a desired frame rate, and user settings from saved profile data.

19. The one or more machine-readable storage devices of claim 16 having further executable instructions comprising one of the following:
decreasing a resolution to maintain a frame rate if available bandwidth is insufficient;
decreasing the frame rate to maintain the resolution if the available bandwidth is insufficient;
decreasing the resolution and decreasing the frame rate;
increasing the resolution while decreasing or maintaining the frame rate;
increasing the frame rate while decreasing or maintaining the resolution; or
increasing the frame rate and increasing the resolution.

20. The method of claim 1, wherein the contextual information comprises sensor-sensed data.

* * * * *